(12) United States Patent
Alfawzan et al.

(10) Patent No.: US 12,540,799 B2
(45) Date of Patent: Feb. 3, 2026

(54) LIGHTWEIGHT BALLISTIC GLASSES

(71) Applicant: SABIC Global Technologies B.V., Bergen OP Zoom (NL)

(72) Inventors: Abdulrhman Mohammad Alfawzan, Riyadh (SA); Waleed Fahad Allafi, Riyadh (SA); Mohannad Abulghaith Alhaidari, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 203 days.

(21) Appl. No.: 18/470,796

(22) Filed: Sep. 20, 2023

(65) Prior Publication Data

US 2024/0093971 A1 Mar. 21, 2024

(30) Foreign Application Priority Data

Sep. 20, 2022 (EP) .................................. 22196706

(51) Int. Cl.
- *F41H 5/04* (2006.01)
- *B32B 17/10* (2006.01)
- *F41H 5/26* (2006.01)

(52) U.S. Cl.
CPC ..... *F41H 5/0407* (2013.01); *B32B 17/10064* (2013.01); *B32B 17/10119* (2013.01); *B32B 17/10752* (2013.01); *B32B 17/1077* (2013.01); *B32B 17/10972* (2013.01); *B32B 17/1099* (2013.01); *B32B 2250/05* (2013.01); *B32B 2307/718* (2013.01);
(Continued)

(58) Field of Classification Search
CPC ............. F41H 5/0407; B32B 17/10064; B32B 17/10752; B32B 17/1077; B32B 17/10871; B32B 17/1099

USPC .......................................................... 428/98
See application file for complete search history.

(56) References Cited

U.S. PATENT DOCUMENTS

| 7,641,965 B1 | 1/2010 | Bennison et al. |
| 8,088,472 B2 | 1/2012 | Mannheim Astete et al. |

(Continued)

FOREIGN PATENT DOCUMENTS

| CN | 111038045 A | 4/2020 |
| CN | 214294850 U | 9/2021 |

(Continued)

OTHER PUBLICATIONS

Grujicic et al., "Effect of the tin-versus air-side plate-glass orientation on the impact response and penetration resistance of a laminated transparent armour structure", Proc. IMechE vol. 226 Part L: J. Materials: Design and Applications, pp. 119-143, Apr. 2012.

(Continued)

*Primary Examiner* — Tahseen Khan
(74) *Attorney, Agent, or Firm* — Womble Bond Dickinson (US) LLP

(57) ABSTRACT

Lightweight ballistic glasses are provided that provide effective protection from ballistic attack while also being lightweight enough for use in armored vehicles and aircraft. In addition to other embodiments, a multilayered lightweight ballistic glass is provided that meets the CEN 1063 Level BR7 standard while having a weight of no greater than about 155 kilograms per square meter (kg/m$^2$), and a total thickness of less than about 75 mm.

15 Claims, 2 Drawing Sheets

(52) U.S. Cl.
CPC . *B32B 2307/7376* (2023.05); *B32B 2309/105* (2013.01); *B32B 2315/08* (2013.01); *B32B 2369/00* (2013.01); *B32B 2375/00* (2013.01); *B32B 2571/02* (2013.01); *F41H 5/26* (2013.01)

(56) References Cited

U.S. PATENT DOCUMENTS

| | | | |
|---|---|---|---|
| 10,046,540 | B2 | 8/2018 | Leighton et al. |
| 2011/0088541 | A1 | 4/2011 | Pinckney et al. |
| 2012/0167752 | A1 | 7/2012 | Buckner et al. |
| 2012/0269995 | A1* | 10/2012 | Leighton ................ B32B 27/08 428/34 |
| 2013/0302581 | A1* | 11/2013 | Mannheim Astete ...................... C03B 23/0258 156/196 |
| 2014/0013932 | A1* | 1/2014 | Thompson ............ B32B 27/365 89/36.02 |
| 2015/0377595 | A1 | 12/2015 | Scarinci et al. |
| 2017/0152644 | A1* | 6/2017 | Nickodemus .......... E02F 9/163 |

FOREIGN PATENT DOCUMENTS

| | | |
|---|---|---|
| CN | 215850064 U | 2/2022 |
| EP | 0157645 | 10/1985 |
| EP | 2244988 A2 | 11/2010 |
| EP | 2678145 B1 | 4/2021 |
| KR | 10-1864045 B1 | 6/2018 |
| KR | 2018107530 A | 10/2018 |
| WO | 2009150380 | 12/2009 |
| WO | 2013168125 | 11/2013 |
| WO | 2019226495 | 11/2019 |

OTHER PUBLICATIONS

Bless, "Using Depth-of-Penetration Tests to Design Transparent Armor", Experimental Mechanics, vol. 53, pp. 47-51, 2013.
Extended European Search Report for European patent application No. 22196705.2, mailed Feb. 17, 2023.
Extended European Search Report for European patent application No. 22196706.0, mailed Mar. 15, 2023.

* cited by examiner

LIGHTWEIGHT BALLISTIC GLASSES

CROSS-REFERENCE TO RELATED APPLICATION

This U.S. non-provisional application claims priority to and the benefit of European Application No. 22196706.0, filed Sep. 20, 2022, titled, "LIGHTWEIGHT BALLISTIC GLASSES," which is incorporated herein by reference in its entirety.

TECHNICAL FIELD

The present disclosure generally relates to ballistic glasses. More specifically, the present disclosure relates to lightweight ballistic glasses that are light enough to be used in armored vehicles and aircraft among other uses.

BACKGROUND

Ballistic glass, sometimes referred to as bullet-resistant glass, may be used to protect compartments from ballistic attack while also providing adequate light transmission to allow for visual navigation and observation as well as the use of optical or luminary instruments. Non-limiting examples of common compartments that may be protected by ballistic glass are the passenger compartments of armored vehicles and aircraft, including armored helicopters, as well as compartments that house optical instruments or lights, such as the protective compartments surrounding headlights in armored vehicles or aircraft. However, the use of ballistic glass in especially armored vehicles and aircraft is often limited by the weight of the ballistic glass. Accordingly, new lightweight ballistic glasses effective at resisting ballistic attack and suitable for use in weight-sensitive applications such as armored vehicles and aircraft is desirable.

SUMMARY

To address these shortcomings in the art, Applicant has developed lightweight ballistic glasses operable to effectively mitigate ballistic attack while being lightweight enough for use in armored vehicles and aircraft, as well as in mobile ballistic shields, according to the exemplary embodiments disclosed herein.

In certain embodiments, a lightweight ballistic glass is provided. The lightweight ballistic glass may be operable to mitigate a ballistic attack received on an exterior surface of the glass so as to provide protection from ballistic attack to living organisms, objects, or instruments positioned on or adjacent to an interior surface of the ballistic glass. In certain embodiments, the lightweight ballistic glass may be used to protect a compartment, such as the passenger compartments of armored vehicles and aircraft, including armored helicopters, as well as compartments that house optical instruments or lights, such as the protective compartments surrounding headlights in armored vehicles or aircraft. The compartment may also be, for example, a dwelling in need of ballistic protection. In some embodiments, the lightweight ballistic glass may form or otherwise be used in mobile ballistic shields that may be temporarily positioned in front of people, animals, or equipment in need of ballistic protection, but which also needs to be lightweight enough to be carried or otherwise efficiently relocated. In certain embodiments, the provided lightweight ballistic glass may be operable to meet the CEN 1063 Level BR7 standard.

The lightweight ballistic glass may include an exterior side forming an exterior surface of the ballistic glass and an interior side forming an interior surface of the ballistic glass opposite the exterior surface. The exterior surface of the ballistic glass is intended to be positioned so as to face the direction of incoming ballistic attack whereas the interior surface of the ballistic glass is intended to face toward the interior of a compartment intended to be protected from ballistic attack by the ballistic glass. The ballistic glass may include a plurality of borosilicate glass layers and a plurality of exterior aliphatic polyurethane film layers. One of the plurality of borosilicate glass layers may form the exterior surface of the ballistic glass. Each of the plurality of borosilicate glass layers may be separated from an adjacent borosilicate glass layer by at least one of the plurality of exterior aliphatic polyurethane film layers. In some embodiments, each of the plurality of exterior aliphatic polyurethane film layers is in contact with a surface of at least one of the plurality of borosilicate glass layers.

The ballistic glass may also include a plurality of exterior polycarbonate sheets. Each of the plurality of exterior polycarbonate sheets may be positioned between two of the plurality of aliphatic polyurethane film layers such that each of the exterior polycarbonate sheets is in contact with two of the plurality of aliphatic polyurethane film layers. The ballistic glass may also include an interior polycarbonate sheet having a first surface and a second surface. The second surface of the interior polycarbonate sheet may form the interior surface of the ballistic glass opposite the exterior surface. The ballistic glass may also include an interior aliphatic polyurethane film layer in contact with the first surface of the interior polycarbonate sheet. The interior aliphatic polyurethane film layer is positioned to separate the first surface of the polycarbonate sheet from a surface of a borosilicate glass layer. In at least some instances, the interior aliphatic polyurethane film layer may be in contact with a surface of a borosilicate glass layer.

Each of the plurality of exterior aliphatic polyurethane film layers used in the ballistic glass may have a thickness of less than 2 millimeters (mm). In at least some embodiments, each of the plurality of exterior aliphatic polyurethane film layers may have a thickness of from about 0.5 mm to about 1.5 mm, or from about 0.5 mm to about 0.75 mm, or from about 0.60 mm to about 0.65 mm. The interior aliphatic polyurethane film layer may also have a thickness of less than 2 mm. In at least some embodiments, the interior aliphatic polyurethane film layer may be thicker than each of the exterior aliphatic polyurethane film layers. For example, in at least some embodiments, the interior aliphatic polyurethane film layer may have a thickness of from about 1.1 mm to about 1.4 mm, or from about 1.0 mm to about 1.5 mm, or from about 1.2 mm to about 1.3 mm, or from about 1.25 mm to about 1.30 mm. In some embodiments, the exterior and interior aliphatic polyurethane film layers may be the same material.

In at least some embodiments, each of the plurality of exterior polycarbonate sheets used in the ballistic glass may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. In at least some embodiments, the interior polycarbonate sheet may have a thickness of from about 5.5 mm to about 6.5 mm, or from about 5.75 mm to about 6.25 mm, or from about 5.0 mm to about 7.0 mm, or from about 4.5 mm to about 7.5 mm. In at least some embodiments, the interior polycarbonate sheet is a hard-coated polycarbonate sheet. In at least some embodiments, each of the exterior polycarbonate sheets is not a hard-coated polycarbonate sheet.

In at least some embodiments, at least one of the plurality of borosilicate glass layers used in the ballistic glass may have a thickness of from about 2 mm to about 22 mm, or from about 3 mm to about 20 mm, or from about 4 mm to about 19 mm. In some embodiments, each of the plurality of borosilicate glass layers may have a thickness of from about 2 mm to about 22 mm, or from about 3 mm to about 20 mm, or from about 4 mm to about 19 mm. In some embodiments, each of the plurality of borosilicate glass layers may have a thickness of from about 3 mm to about 5 mm, or from about 7 mm to about 11 mm, or from about 18 mm to about 20 mm. In other embodiments, each of the plurality of borosilicate glass layers may have a thickness of from about 3.5 mm to about 4.5 mm, or from about 7.5 mm to about 8.5 mm, or from about 9.5 mm to about 11.5 mm, or from about 18.5 mm to about 19.5 mm.

In some embodiments, the lightweight ballistic glass may include no more than six borosilicate glass layers, or alternatively, a total of six borosilicate glass layers. In such embodiments, each of the plurality of borosilicate glass layers may have a thickness of from about 3 mm to about 5 mm, or from about 7 mm to about 11 mm, or from about 18 mm to about 20 mm. In other embodiments, each of the plurality of borosilicate glass layers may have a thickness of from about 3.5 mm to about 4.5 mm, or from about 7.5 mm to about 8.5 mm, or from about 9.5 mm to about 11.5 mm, or from about 18.5 mm to about 19.5 mm.

In some embodiments, the ballistic glass may include one borosilicate glass layer having a thickness from about 3 mm to about 5 mm, one borosilicate glass layer having a thickness from about 7 mm to about 9 mm, three borosilicate glass layers each having a thickness from about 9 mm to about 11 mm, and one borosilicate glass layer having a thickness from about 18 mm to about 20 mm. In other embodiments, the ballistic glass may include one borosilicate glass layer having a thickness from about 3.5 mm to about 4.5 mm, one borosilicate glass layer having a thickness from about 7.5 mm to about 8.5 mm, three borosilicate glass layers each having a thickness from about 9.5 mm to about 10.5 mm, and one borosilicate glass layer having a thickness from about 18.5 mm to about 19.5 mm.

Each or any one of the plurality of borosilicate glass layers in the ballistic glass may be a borosilicate glass type 3.3 as specified in international standards ISO 3585 and EN 1748 T1. In at least some embodiments, each or any one of the plurality of borosilicate glass layers may comprise from about 12% to about 14% by weight $B_2O_3$ and from about 80% to about 82% by weight $SiO_2$. Each or any one of the plurality of borosilicate glass layers may also comprise from about 3% to about 5% by weight $Na_2O$ or $K_2O$ and from about 1% to about 3% by weight $Al_2O_3$.

In some embodiments, the ballistic glass may include a first borosilicate glass layer forming the exterior surface of the lightweight ballistic glass. The first borosilicate glass layer may have a thickness of from about 3.5 mm to about 4.5 mm, or from about 3 mm to about 5 mm, or from about 2 mm to about 6 mm. The ballistic glass may also include a first polycarbonate sheet separated from the first borosilicate glass layer by a first aliphatic polyurethane film layer. The first polycarbonate sheet may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. The ballistic glass may also include a second borosilicate glass layer separated from the first polycarbonate sheet by a second aliphatic polyurethane film layer. The second borosilicate glass layer may have a thickness from about 7.5 mm to about 8.5 mm, or from about 7 mm to about 9 mm, or from about 6 mm to about 10 mm. The ballistic glass may also include a third borosilicate glass layer separated from the second borosilicate glass layer by a third aliphatic polyurethane film layer. The third borosilicate glass layer may have a thickness from about 9.5 mm to about 10.5 mm, or from about 9 mm to about 11 mm, or from about 8 mm to about 12 mm.

The ballistic glass may also include a second polycarbonate sheet separated from the third borosilicate glass layer by a fourth aliphatic polyurethane film layer. The second polycarbonate sheet may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. The ballistic glass may also include a fourth borosilicate glass layer separated from the second polycarbonate sheet by a fifth aliphatic polyurethane film layer. The fourth borosilicate glass layer may have a thickness from about 9.5 mm to about 10.5 mm, or from about 9 mm to about 11 mm, or from about 8 mm to about 12 mm. The ballistic glass may also include a fifth borosilicate glass layer separated from the fourth borosilicate glass layer by a sixth aliphatic polyurethane film layer. The fifth borosilicate glass layer may have a thickness from about 9.5 mm to about 10.5 mm, or from about 9 mm to about 11 mm, or from about 8 mm to about 12 mm. The ballistic glass may also include a sixth borosilicate glass layer separated from the fifth borosilicate glass layer by a seventh aliphatic polyurethane film layer. The sixth borosilicate glass layer may have a thickness from about 18.5 mm to about 19.5 mm, or from about 18 mm to about 20 mm, or from about 17 mm to about 21 mm, or from about 16 mm to about 22 mm.

The ballistic glass may also include a third polycarbonate sheet forming the interior surface of the lightweight ballistic glass and separated from the sixth borosilicate glass layer by an eighth aliphatic polyurethane film layer. The third polycarbonate sheet may have a thickness of from about 5.5 mm to about 6.5 mm, or from about 5 mm to about 7 mm, or from about 5.75 mm to about 6.25 mm, or from about 4 mm to about 8 mm. In some embodiments, the first, second, third, fourth, fifth, sixth, and seventh aliphatic polyurethane film layers used in the ballistic glass may have a thickness from about 0.60 mm to about 0.65 mm and the eighth aliphatic polyurethane film layer has a thickness of from about 1.1 mm to about 1.4 mm. In other embodiments, the aliphatic polyurethane film layers may have other thicknesses as described throughout this specification. In particular, the first, second, third, fourth, fifth, sixth, and seventh polyurethane film layers may have a thickness that is less than about 2 mm or from about 0.5 mm to about 1.5 mm, or from about 0.5 mm to about 0.75 mm, or from about 0.60 mm to about 0.65 mm. The eighth aliphatic polyurethane film layer may have a thickness that is less than 2 mm or from about 1.1 mm to about 1.4 mm, or from about 1.0 mm to about 1.5 mm, or from about 1.2 mm to about 1.3 mm, or from about 1.25 mm to about 1.30 mm. The lightweight ballistic glass may have a total thickness of less than about 75 mm, or less than about 76 mm, or less than about 77 mm, or less than about 85 mm. In some embodiments, the ballistic glass may have a total thickness that is about 75 mm.

The first aliphatic polyurethane film layer used in the ballistic glass may be in direct contact with the first borosilicate glass layer and the first polycarbonate sheet, while the second aliphatic polyurethane film layer may be in direct contact with the second borosilicate glass layer and the first polycarbonate sheet. Likewise, the third aliphatic polyurethane film layer may be in direct contact with the second borosilicate glass layer and the third borosilicate glass layer, the fourth aliphatic polyurethane film layer may be in direct contact with the third borosilicate glass layer and the second polycarbonate sheet, the fifth aliphatic polyurethane film layer may be in direct contact with the fourth borosilicate glass layer and the second polycarbonate sheet, the sixth aliphatic polyurethane film layer may be in direct contact with the fourth borosilicate glass layer and the fifth borosilicate glass layer, the seventh aliphatic polyurethane film layer may be in contact with the fifth borosilicate glass layer and the sixth borosilicate glass layer, and the eighth aliphatic polyurethane film layer may be in direct contact with the sixth borosilicate glass layer and the third polycarbonate sheet. The eighth aliphatic polyurethane film layer may be the interior aliphatic polyurethane film layer described above while the first, second, third, fourth, fifth, sixth, and seventh aliphatic polyurethane film layers may be an exterior aliphatic polyurethane film layer as described above.

In some embodiments, the lightweight ballistic glass may have a weight of no greater than about 155 kilograms per square meter ($kg/m^2$) of exterior surface or interior surface. In other embodiments, the lightweight ballistic glass may have a weight of no greater than about 150 $kg/m^2$ of exterior surface or interior surface. In some embodiments, the lightweight ballistic glass may have a weight of about 155 kilograms per square meter ($kg/m^2$) of exterior surface or interior surface. In other embodiments, the lightweight ballistic glass may have a weight of about 150 $kg/m^2$ of exterior surface or interior surface. In some embodiments, the lightweight ballistic glass may have a weight of from about 145 $kg/m^2$ of exterior surface or interior surface to about 160 $kg/m^2$, or from about 152 $kg/m^2$ to about 158 $kg/m^2$, or from about 154 $kg/m^2$ to about 156 $kg/m^2$.

In certain embodiments, a method of manufacturing a multi-layered lightweight ballistic glass is provided. The method may include assembling a multi-layered structure comprising: a first borosilicate glass layer forming the exterior surface of the lightweight ballistic glass, the first borosilicate glass layer having a thickness from about 3.5 mm to about 4.5 mm; a first polycarbonate sheet separated from the first borosilicate glass layer by a first aliphatic polyurethane film layer, the first polycarbonate sheet having a thickness from about 0.5 mm to about 1.5 mm; a second borosilicate glass layer separated from the first polycarbonate sheet by a second aliphatic polyurethane film layer, the second borosilicate glass layer having a thickness from about 7.5 mm to about 8.5 mm; a third borosilicate glass layer separated from the second borosilicate glass layer by a third aliphatic polyurethane film layer, the third borosilicate glass layer having a thickness from about 9.5 mm to about 10.5 mm; a second polycarbonate sheet separated from the third borosilicate glass layer by a fourth aliphatic polyurethane film layer, the second polycarbonate sheet having a thickness from about 0.5 mm to about 1.5 mm; a fourth borosilicate glass layer separated from the second polycarbonate sheet by a fifth aliphatic polyurethane film layer, the fourth borosilicate glass layer having a thickness from about 9.5 mm to about 10.5 mm; a fifth borosilicate glass layer separated from the fourth borosilicate glass layer by a sixth aliphatic polyurethane film layer, the fifth borosilicate glass layer having a thickness from about 9.5 mm to about 10.5 mm; a sixth borosilicate glass layer separated from the fifth borosilicate glass layer by a seventh aliphatic polyurethane film layer, the sixth borosilicate glass layer having a thickness from about 18.5 mm to about 19.5 mm; and a third polycarbonate sheet forming the interior surface of the lightweight ballistic glass and separated from the sixth borosilicate glass layer by an eighth aliphatic polyurethane film layer, the third polycarbonate sheet having a thickness from about 5.5 mm to about 6.5 mm; wherein the first, second, third, fourth, fifth, sixth, and seventh aliphatic polyurethane film layers have a thickness from about 0.60 mm to about 0.65 mm and the eighth aliphatic polyurethane film layer has a thickness of from about 1.1 mm to about 1.4 mm. The method may also include (1) applying a cold vacuum to the multi-layered structure in order to remove air from interlayer regions between adjacent borosilicate glass layers or an adjacent borosilicate glass layer and a polycarbonate sheet, the interlayer regions comprising an aliphatic polyurethane film layer; (2) heating the multi-layered structure in order to cause the aliphatic polyurethane film layers to melt thereby bonding together adjacent borosilicate glass layers or an adjacent borosilicate glass layer and a polycarbonate sheet; (3) applying a hot vacuum to the multi-layered structure in order to remove additional remaining air from the interlayer regions; (4) cooling the multi-layered structure to an ambient temperature; and (5) removing the vacuum to produce the multi-layered lightweight ballistic glass.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
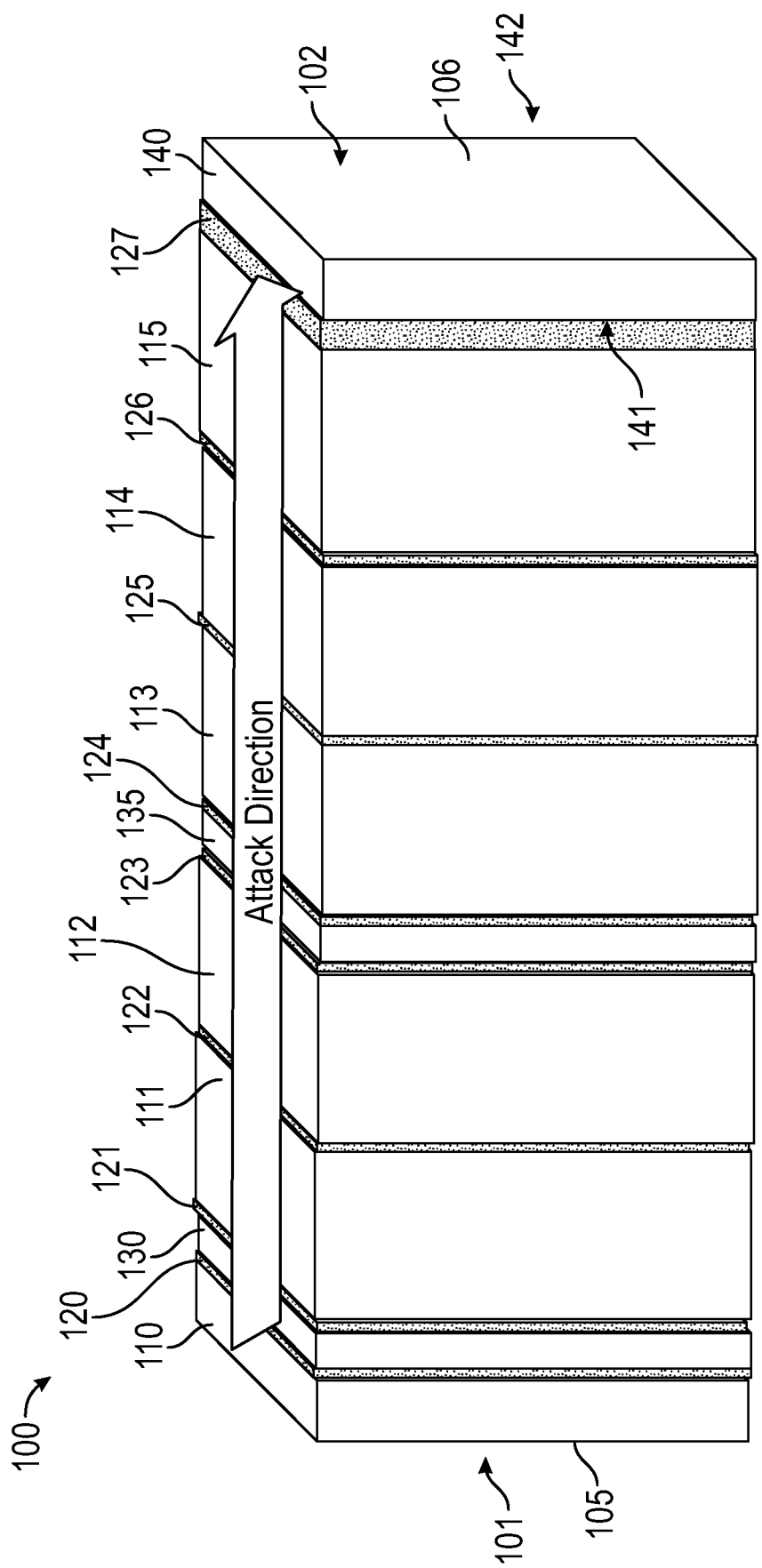
FIG. 1 is a graphical representation of a lightweight ballistic glass, according to an exemplary embodiment of the present disclosure.

The present disclosure describes various embodiments related to lightweight ballistic glasses as well as methods of manufacturing lightweight ballistic glasses. Further embodiments may be described and disclosed.

In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "reducing," "reduced," or any variation thereof, when used in the claims and/or the specification includes any measurable decrease or complete inhibition to achieve a desired result.

The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Disclosed here are lightweight ballistic glasses as well as methods of manufacturing or assembling such lightweight ballistic glasses. In particular, the Applicant has unexpectedly discovered that the application of multiple layers of borosilicate glass separated by high tenacity polyurethane interlayers, in the arrangement and thicknesses provided in the present disclosure, increases the elasticity and Young's modulus of the glass resulting in effective ballistic attack mitigation while being still lightweight enough to be deployed in armored vehicles which require reduced payload weights and increased maneuverability. The presently disclosed multi-layer ballistic glasses include high-strength polycarbonate sheets and lightweight borosilicate glass layers, providing increased hardness and strength, as well as high tenacity polyurethane interlayers, in particular thicknesses and arrangements that have been unexpectedly discovered to minimize weight while providing desirable resistance to ballistic attack.

FIG. 1 is a schematic depicting a lightweight ballistic glass 100, according to an exemplary embodiment of the present disclosure. As depicted in FIG. 1, lightweight ballistic glass 100 may include an exterior side 101 comprising an exterior surface 105 of the ballistic glass and an interior side 102 comprising an interior surface 106 of the ballistic glass opposite the exterior surface 105. The exterior surface 105 of the ballistic glass 100 is intended to be positioned so as to face the direction of incoming ballistic attack whereas the interior surface 106 of the ballistic glass 100 is intended to face toward the interior of a compartment intended to be protected from ballistic attack by the ballistic glass. Non-limiting examples of compartments that may be protected by lightweight ballistic glass 100 are the passenger compartments of armored vehicles and aircraft, including armored helicopters, as well as compartments that house optical instruments or lights, such as the protective compartments surrounding headlights in armored vehicles or aircraft. The compartment may also be, for example, a dwelling in need of ballistic protection. The presently disclosed lightweight ballistic glasses may also take the form of a mobile ballistic shield that may be temporarily positioned in front of people, animals, or equipment in need of ballistic protection but which also needs to be lightweight enough to be carried or otherwise efficiently relocated, while still allowing visual observation through the glass.

As depicted in FIG. 1, ballistic glass 100 may include a plurality of borosilicate glass layers, such as borosilicate glass layers 110, 111, 112, 113, 114, 115 and a plurality of exterior aliphatic polyurethane film layers 120, 121, 122, 123, 124, 125, 126. Each of the plurality of borosilicate glass layers 110, 111, 112, 113, 114, 115 may be separated from an adjacent borosilicate glass layer by at least one of the plurality of exterior aliphatic polyurethane film layers 120, 121, 122, 123, 124, 125, 126. As shown in FIG. 1, each of the plurality of exterior aliphatic polyurethane film layers 120, 121, 122, 123, 124, 125, 126 may be in contact with a surface of at least one of the plurality of borosilicate glass layers 110, 111, 112, 113, 114, 115.

Ballistic glass 100 may also include a plurality of exterior polycarbonate sheets 130, 135. Each of the plurality of exterior polycarbonate sheets 130, 135 may be positioned between two of the plurality of aliphatic polyurethane film layers such that each of the exterior polycarbonate sheets 130, 135 is in contact with two of the plurality of aliphatic polyurethane film layers, such as aliphatic polyurethane film layers 120, 121 or 123, 124.

Ballistic glass 100 may include an interior polycarbonate sheet 140 having a first surface 141 and a second surface 142. The second surface 142 of the polycarbonate sheet forms the interior surface 102 of the ballistic glass 100. Ballistic glass 100 may also include an interior aliphatic polyurethane film layer 127 in contact with the first surface 141 of the interior polycarbonate sheet 140. The interior aliphatic polyurethane film layer 127 may be positioned to separate the first surface 141 of the interior polycarbonate sheet 140 from a surface of a borosilicate glass layer, such as borosilicate glass layer 115. In at least some instances, the interior aliphatic polyurethane film layer 127 may be in contact with a surface of a borosilicate glass layer, such as borosilicate glass layer 115.

Each of the plurality of exterior aliphatic polyurethane film layers 120, 121, 122, 123, 124, 125, 126 may have a thickness of less than 2 millimeters (mm). In at least some embodiments, each of the plurality of exterior aliphatic polyurethane film layers may have a thickness of from about 0.5 mm to about 1.5 mm, or from about 0.5 mm to about 0.75 mm, or from about 0.60 mm to about 0.65 mm. The interior aliphatic polyurethane film layer 127 may also have a thickness of less than 2 mm. In at least some embodiments, the interior aliphatic polyurethane film layer 127 may be thicker than each of the exterior aliphatic polyurethane film layers 120, 121, 122, 123, 124, 125, 126. For example, in at least some embodiments, the interior aliphatic polyurethane film layer 127 may have a thickness of from about 1.1 mm to about 1.4 mm, or from about 1.0 mm to about 1.5 mm, or from about 1.2 mm to about 1.3 mm, or from about 1.25 mm to about 1.30 mm. In some embodiments, the exterior and interior aliphatic polyurethane film layers may be the same material. In some instances, the exterior and interior aliphatic polyurethane film layers may include appropriate aliphatic polyurethane films, such as those manufactured by American Polyfilm Inc., PPG Aerospace Transparent Armor and Specialty Products, Polymar, Armor Aerospace Inc., or Argotec, Inc.

In at least some embodiments, each of the plurality of exterior polycarbonate sheets 130, 135 may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. In at least some embodiments, the interior polycarbonate sheet 140 may have a thickness of from about 5.5 mm to about 6.5 mm, or from about 5.75 mm to about 6.25 mm, or from about 5.0 mm to about 7.0 mm, or from about 4.5 mm to about 7.5 mm. In at least some embodiments, the interior polycarbonate sheet 140 is a hard-coated polycarbonate sheet. For example, in some embodiments, the interior polycarbonate sheet 140 may be any ballistic grade polycarbonate sheet. In certain embodiments, the polycarbonate sheet includes the Lexan HLG-5 manufactured by SABIC Innovative Plastics (USA). In at least some embodiments, each of the exterior polycarbonate sheets 130, 135 is not a hard-coated polycarbonate sheet. In at least some embodiments, each of the exterior polycarbonate sheets 130, 135 may be ballistic grade polycarbonate sheet, such as Lexan 9030 manufactured by SABIC Innovative Plastics (USA).

In at least some embodiments, at least one of the plurality of borosilicate glass layers 110, 111, 112, 113, 114, 115 may have a thickness of from about 2 mm to about 22 mm, or from about 3 mm to about 20 mm, or from about 4 mm to about 19 mm. In some embodiments, each of the plurality of borosilicate glass layers may have a thickness of from about 2 mm to about 22 mm, or from about 3 mm to about 20 mm, or from about 4 mm to about 19 mm. In some embodiments, each of the plurality of borosilicate glass layers may have a thickness of from about 3 mm to about 5 mm, or from about 7 mm to about 11 mm, or from about 18 mm to about 20 mm. In other embodiments, each of the plurality of borosilicate glass layers may have a thickness of from about 3.5 mm to about 4.5 mm, or from about 7.5 mm to about 8.5 mm, or from about 9.5 mm to about 11.5 mm, or from about 18.5 mm to about 19.5 mm.

In some embodiments, lightweight ballistic glass 100 may comprise no more than six borosilicate glass layers, such as borosilicate glass layers 110, 111, 112, 113, 114, 115 shown in FIG. 1. In such embodiments, each of the plurality of borosilicate glass layers 110, 111, 112, 113, 114, 115 may have a thickness of from about 3 mm to about 5 mm, or from about 7 mm to about 11 mm, or from about 18 mm to about 20 mm. In other embodiments, each of the plurality of borosilicate glass layers may have a thickness of from about 3.5 mm to about 4.5 mm, or from about 7.5 mm to about 8.5 mm, or from about 9.5 mm to about 11.5 mm, or from about 18.5 mm to about 19.5 mm.

In some embodiments, lightweight ballistic glass 100 may comprise a total of six borosilicate glass layers, such as borosilicate glass layers 110, 111, 112, 113, 114, 115 shown in FIG. 1. In such embodiments, each of the plurality of borosilicate glass layers may have a thickness of from about 3 mm to about 5 mm, or from about 7 mm to about 11 mm, or from about 18 mm to about 20 mm. In other embodiments, each of the plurality of borosilicate glass layers may have a thickness of from about 3.5 mm to about 4.5 mm, or from about 7.5 mm to about 8.5 mm, or from about 9.5 mm to about 11.5 mm, or from about 18.5 mm to about 19.5 mm.

In some embodiments, ballistic glass 100 may include one borosilicate glass layer having a thickness from about 3 mm to about 5 mm, one borosilicate glass layer having a thickness from about 7 mm to about 9 mm, three borosilicate glass layers each having a thickness from about 9 mm to about 11 mm, and one borosilicate glass layer having a thickness from about 18 mm to about 20 mm. In other embodiments, ballistic glass 100 may include one borosilicate glass layer having a thickness from about 3.5 mm to about 4.5 mm, one borosilicate glass layer having a thickness from about 7.5 mm to about 8.5 mm, three borosilicate glass layers each having a thickness from about 9.5 mm to about 10.5 mm, and one borosilicate glass layer having a thickness from about 18.5 mm to about 19.5 mm.

Each or any one of the plurality of borosilicate glass layers, such as borosilicate glass layers 110, 111, 112, 113, 114, 115, may be a borosilicate glass type 3.3 as specified in international standards ISO 3585 and EN 1748 T1. In at least some embodiments, each or any one of the plurality of borosilicate glass layers may comprise from about 12% to about 14% by weight $B_2O_3$ and from about 80% to about 82% by weight $SiO_2$. Each or any one of the plurality of borosilicate glass layers may also comprise from about 3% to about 5% by weight $Na_2O$ or $K_2O$ and from about 1% to about 3% by weight $Al_2O_3$. In some embodiments, each or any one of the plurality of borosilicate glass layers may be Borofloat-33 manufactured by Schott North America Inc. or Bolite-33 manufactured by Armor Aerospace Inc. or similar glass layers manufactured by Mil-Spec Industries, PPG Industries, or Oldcastle Glass.

As depicted in FIG. 1, lightweight ballistic glass 100 may include a first borosilicate glass layer 110 forming the exterior surface 105 and/or exterior side 101 of the lightweight ballistic glass 100. The first borosilicate glass layer 110 may have a thickness of from about 3.5 mm to about 4.5 mm, or from about 3 mm to about 5 mm, or from about 2 mm to about 6 mm. Ballistic glass 100 may also include a first polycarbonate sheet 130 separated from the first borosilicate glass layer 110 by a first aliphatic polyurethane film layer 120. The first polycarbonate sheet 130 may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. Ballistic glass 100 may also include a second borosilicate glass layer 111 separated from the first polycarbonate sheet 130 by a second aliphatic polyurethane film layer 121. The second borosilicate glass layer 111 may have a thickness from about 7.5 mm to about 8.5 mm, or from about 7 mm to about 9 mm, or from about 6 mm to about 10 mm. Ballistic glass 100 may also include a third borosilicate glass layer 112 separated from the second borosilicate glass layer 111 by a third aliphatic polyurethane film layer 122. The third borosilicate glass layer 112 may have a thickness from about 9.5 mm to about 10.5 mm, or from about 9 mm to about 11 mm, or from about 8 mm to about 12 mm.

As depicted in FIG. 1, ballistic glass 100 may also include a second polycarbonate sheet 135 separated from the third borosilicate glass layer 112 by a fourth aliphatic polyurethane film layer 123. The second polycarbonate sheet 135 may have a thickness of from about 0.5 mm to about 1.5 mm, or from about 0.9 mm to about 1.1 mm, or from about 0.8 mm to about 1.2 mm, or from about 0.95 mm to about 1.05 mm, or from about 0.7 mm to about 1.3 mm. Ballistic glass 100 may also include a fourth borosilicate glass layer 113 separated from the second polycarbonate sheet 135 by a fifth aliphatic polyurethane film layer 124. The fourth borosilicate glass layer 113 may have a thickness from about 9.5 mm to about 10.5 mm, or from about 9 mm to about 11 mm, or from about 8 mm to about 12 mm. Ballistic glass 100 may also include a fifth borosilicate glass layer 114 separated from the fourth borosilicate glass layer 113 by a sixth aliphatic polyurethane film layer 125. The fifth borosilicate glass layer 114 may have a thickness from about 9.5 mm to about 10.5 mm, or from about 9 mm to about 11 mm, or from about 8 mm to about 12 mm. Ballistic glass 100 may also include a sixth borosilicate glass layer 115 separated from the fifth borosilicate glass layer 114 by a seventh aliphatic polyurethane film layer 126. The sixth borosilicate glass layer 115 may have a thickness from about 18.5 mm to about 19.5 mm, or from about 18 mm to about 20 mm, or from about 17 mm to about 21 mm, or from about 16 mm to about 22 mm.

As depicted in FIG. 1, ballistic glass 100 may also include a third polycarbonate sheet 140 forming the interior surface of the lightweight ballistic glass 100 and separated from the sixth borosilicate glass layer 115 by an eighth aliphatic polyurethane film layer 127. The third polycarbonate sheet 140 may have a thickness of from about 5.5 mm to about 6.5 mm, or from about 5 mm to about 7 mm, or from about 5.75 mm to about 6.25 mm, or from about 4 mm to about 8 mm. In some embodiments, the first, second, third, fourth, fifth, sixth, and seventh aliphatic polyurethane film layers 120, 121, 122, 123, 124, 125, 126 in ballistic glass 100 depicted in FIG. 1 may have a thickness from about 0.60 mm to about 0.65 mm and the eighth aliphatic polyurethane film layer 227 has a thickness of from about 1.1 mm to about 1.4 mm. In other embodiments, the aliphatic polyurethane film layers may have other thicknesses as described throughout this specification. In particular, the first, second, third, fourth, fifth, sixth, and seventh polyurethane film layers 120, 121, 122, 123, 124, 125, 126 may have a thickness that is less than about 2 mm or from about 0.5 mm to about 1.5 mm, or from about 0.5 mm to about 0.75 mm, or from about 0.60 mm to about 0.65 mm. The eighth aliphatic polyurethane film layer 127 may have a thickness that is less than 2 mm or from about 1.1 mm to about 1.4 mm, or from about 1.0 mm to about 1.5 mm, or from about 1.2 mm to about 1.3 mm, or from about 1.25 mm to about 1.30 mm.

As shown in FIG. 1, the first aliphatic polyurethane film layer 120 may be in direct contact with the first borosilicate glass layer 110 and the first polycarbonate sheet 130, the second aliphatic polyurethane film layer 121 may be in direct contact with the second borosilicate glass layer 111 and the first polycarbonate sheet 130, the third aliphatic polyurethane film layer 122 may be in direct contact with the second borosilicate glass layer 111 and the third borosilicate glass layer 112, the fourth aliphatic polyurethane film layer 123 may be in direct contact with the third borosilicate glass layer 112 and the second polycarbonate sheet 135, the fifth aliphatic polyurethane film layer 124 may be in direct contact with the fourth borosilicate glass layer 113 and the second polycarbonate sheet 135, the sixth aliphatic polyurethane film layer 125 may be in direct contact with the fourth borosilicate glass layer 113 and the fifth borosilicate glass layer 114, the seventh aliphatic polyurethane film layer 126 may be in contact with the fifth borosilicate glass layer 114 and the sixth borosilicate glass layer 115, and the eighth aliphatic polyurethane film layer 127 may be in direct contact with the sixth borosilicate glass layer 115 and the third polycarbonate sheet 140. The eighth aliphatic polyurethane film layer 127 may be the interior aliphatic polyurethane film layer 127 described above while the first, second, third, fourth, fifth, sixth, and seventh aliphatic polyurethane film layers 120, 121, 122, 123, 124, 125, 126 may be an exterior aliphatic polyurethane film layer as described above.

Lightweight ballistic glass 100 may have a total thickness of less than about 75 mm, or less than about 76 mm, or less than about 77 mm, or less than about 78 mm, or less than about 80 mm, or less than about 85 mm. In some embodiments, ballistic glass 100 may have a total thickness that is about 75 mm. The lightweight ballistic glass 100 depicted in FIG. 1 may be operable to meet the CEN 1063 Level BR7 standard. In particular, the lightweight ballistic glass is operable to stop three impacts of a 7.62×51 mm NATO round occurring within 120 mm of each other at a range of 10.00±0.5 meters, the 7.62×51 mm NATO round having a full metal jacket, pointed bullet, or hard steel core projectile having a weight of 9.8±0.1 grams, and when fired having a projectile velocity of 820±10 m/s resulting in an impact energy of 3290 Joules, wherein the hard steel core projectile has a steel hardness greater than 63 HRC on the Rockwell scale. In such instances, the lightweight ballistic glass is operable to produce no observable spalls after each impact.

In some embodiments, the lightweight ballistic glass 100 may have a weight of no greater than about 155 kilograms per square meter ($kg/m^2$) of exterior surface or interior surface. In other embodiments, the lightweight ballistic glass 100 may have a weight of no greater than about 150 $kg/m^2$ of exterior surface or interior surface. In some embodiments, the lightweight ballistic glass 100 may have a weight of about 155 kilograms per square meter ($kg/m^2$) of exterior surface or interior surface. In other embodiments, the lightweight ballistic glass 100 may have a weight of about 150 $kg/m^2$ of exterior surface or interior surface. In some embodiments, the lightweight ballistic glass 100 may have a weight of from about 145 $kg/m^2$ of exterior surface or interior surface to about 160 $kg/m^2$, or from about 152 $kg/m^2$ to about 158 $kg/m^2$, or from about 154 $kg/m^2$ to about 156 $kg/m^2$.

In at least some embodiments, the aliphatic polyurethane film layers may be operable to bind adjacent borosilicate glass layers and/or an adjacent borosilicate glass layer and a polycarbonate sheet. In particular, the aliphatic polyurethane film layers may be configured to melt when exposed to heat, thereby bonding to an adjacent borosilicate glass layer or polycarbonate sheet resulting in a bonded multilayer structure comprising borosilicate glass layers and polycarbonate sheets bound by an interlayer comprising an aliphatic polyurethane film layer.

In at least some embodiments, each of the layers or sheets in lightweight ballistic glass 100 may be adhered to an adjacent layer or sheet by an interfacial layer of adhesive. In some instances, the interfacial layer of adhesive may be a high-performance adhesive or synthetic resin. In some embodiments, the interfacial layer of adhesive may be selected from the group consisting of an epoxy, polyurethane, and polyvinyl butyral (PVB) resin. As used herein, the term "in contact," in all of its forms, refers to a layer or sheet that is directly in contact with an adjacent layer or sheet or that is be "in contact" with the adjacent layer or sheet via an interfacial layer of adhesive. For example, a polycarbonate sheet or borosilicate glass layer may be in contact with an aliphatic polyurethane film even though they are adhered to the film by an interfacial layer of adhesive.

In other embodiments, the aliphatic polyurethane film layers may be operable to adhere adjacent borosilicate glass or polycarbonate sheets to one another. In such instances, no other interfacial layer of adhesive may be needed to adhere a borosilicate glass layer or a polycarbonate sheet to an adjacent borosilicate layer or polycarbonate sheet. It has been discovered by the Applicant that the thickness and arrangement of the interfacial aliphatic polyurethane film layers can be especially important in determining the ballistic performance of the lightweight ballistic glass 100 as well as the ability to produce ballistic glasses that are both effective at mitigating ballistic attack and sufficiently lightweight for applications requiring reduced weight, such as use in armored vehicles and helicopters.

EXAMPLES

The example provided below illustrates selected aspects of the various embodiments of lightweight ballistic glasses and their methods of assembly.

Example 1

Figure 2:
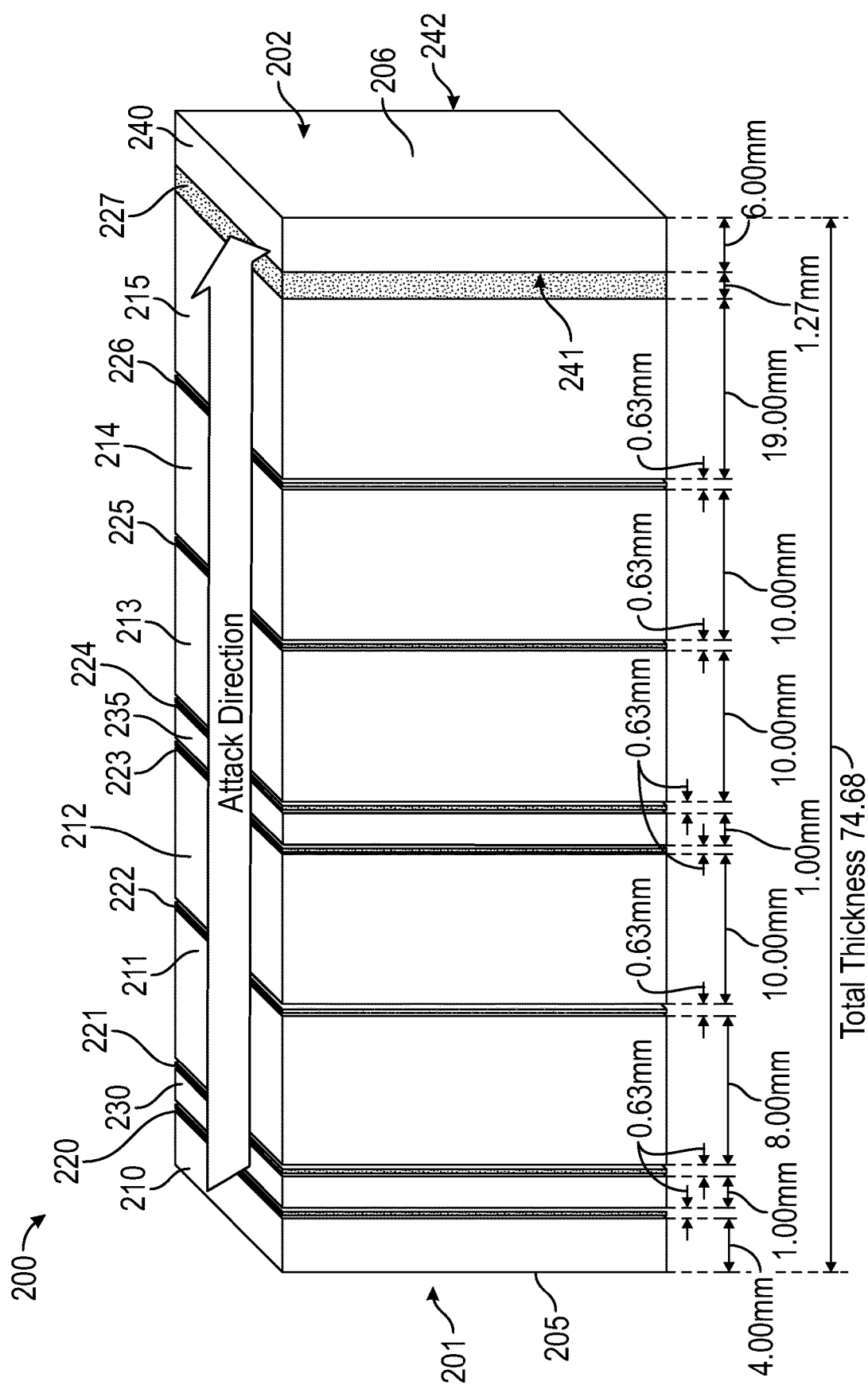
FIG. 2 is a graphical representation of an exemplary lightweight ballistic glass operable to meet the CEN 1063 Level BR7 standard constructed and tested according to Example 1, according to an exemplary embodiment of the present disclosure.

FIG. 2 depicts an exemplary embodiment of lightweight ballistic glass 200 operable to meet the CEN 1063 Level BR7 standard. As described above, other embodiments of ballistic glass are possible, including other embodiments operable to meet the CEN 1063 Level BR7 standard. As depicted in FIG. 2, lightweight ballistic glass 200 includes an exterior side 201 comprising an exterior surface 205 of the ballistic glass and an interior side 202 comprising an interior surface 206 of the ballistic glass opposite the exterior surface 205. The BR7 lightweight ballistic glass 200 depicted in FIG. 2 includes a first borosilicate glass layer 210 forming the exterior surface 205 and/or exterior side 201 of the lightweight ballistic glass 200. The first borosilicate glass layer 210 has a thickness of 4.00 mm. The example BR7 ballistic glass 200 also includes a first polycarbonate sheet 230 separated from the first borosilicate glass layer 210 by a first aliphatic polyurethane film layer 220. The first polycarbonate sheet 230 has a thickness of 1.00 mm. The BR7 ballistic glass 200 further includes a second borosilicate glass layer 211 separated from the first polycarbonate sheet 230 by a second aliphatic polyurethane film layer 221. The second borosilicate glass layer 211 has a thickness of 8.00 mm. The BR7 ballistic glass 200 also includes a third borosilicate glass layer 212 separated from the second borosilicate glass layer 211 by a third aliphatic polyurethane film layer 222. The third borosilicate glass layer 212 has a thickness of 10.00 mm.

As depicted in FIG. 2, the example BR7 ballistic glass 200 also includes a second polycarbonate sheet 235 separated from the third borosilicate glass layer 212 by a fourth aliphatic polyurethane film layer 223. The second polycarbonate sheet 235 has a thickness of 1.00 mm. The exemplary BR7 ballistic glass 200 also includes a fourth borosilicate glass layer 213 separated from the second polycarbonate sheet 235 by a fifth aliphatic polyurethane film layer 224. The fourth borosilicate glass layer 213 has a thickness of 10.00 mm. Exemplary BR7 ballistic glass 200 further includes a fifth borosilicate glass layer 214 separated from the fourth borosilicate glass layer 213 by a sixth aliphatic polyurethane film layer 225. The fifth borosilicate glass layer 214 has a thickness of 10.00 mm. The exemplary BR7 ballistic glass 200 shown in FIG. 2 also includes a sixth borosilicate glass layer 215 separated from the fifth borosilicate glass layer 214 by a seventh aliphatic polyurethane film layer 226. The sixth borosilicate glass layer 215 has a thickness of 19.00 mm, as shown in FIG. 2.

As depicted in FIG. 2, BR7 ballistic glass 200 also includes a third polycarbonate sheet 240 forming the interior surface 206 and/or interior side 202 of the lightweight ballistic glass 200 and separated from the sixth borosilicate glass layer 215 by an eighth aliphatic polyurethane film layer 227. The third polycarbonate sheet 240 has a thickness of 6.00 mm. The first, second, third, fourth, fifth, sixth, and seventh aliphatic polyurethane film layers 220, 221, 222, 223, 224, 225, 226 included in ballistic glass 200 and depicted in FIG. 2 have a thickness of 0.63 mm while the eighth aliphatic polyurethane film layer 227 has a thickness of 1.27 mm. The total thickness of the BR7 ballistic glass depicted in FIG. 2 is 74.68 mm. The BR7 ballistic glass depicted in FIG. 2 was also measured to have a weight of 155 kilograms per square meter ($kg/m^2$) of exterior surface or interior surface.

The first, second, third, fourth, fifth, and sixth borosilicate glass layers 210, 211, 212, 213, 214, 215 can be made of Borofloat-33 borosilicate glass produced by Schott North America Inc. or Bolite-33 borosilicate glass manufactured by Armor Aerospace Inc. or similar glass layers manufactured by Mil-Spec Industries, PPG Industries, or Oldcastle Glass. Exterior polycarbonate sheets 230, 235 were constructed of Lexan 9030 polycarbonate sheet manufactured by SABIC Innovative Plastics (USA). Interior polycarbonate sheet 240 was a hard-coated polycarbonate sheet sold as Lexan HLG-5 by SABIC Innovative Plastics (USA). Each of the aliphatic polyurethane film layers 220, 221, 222, 223, 224, 225, 226, 227 can be one or more aliphatic polyurethane film layers manufactured by companies, such as by American Polyfilm Inc., PPG Aerospace Transparent Armor and Specialty Products, Polymar, Armor Aerospace Inc., or Argotec, Inc.

Lightweight ballistic glass 200 was assembled by cutting the borosilicate glass layers, polycarbonate sheets, and polyurethane film layers, having the thicknesses described above, to the desired shape and dimensions for assembly. After the borosilicate glass layers and polycarbonate sheets were cleaned, inspected, and the edges ground, the respective layers may be laminated or assembled in a stacked manner with polyurethane film layers separating adjacent borosilicate glass layers or polycarbonate sheets to form a multi-layer assembly which may be the complete lightweight ballistic glass 200 or a multi-layer portion thereof.

The multi-layer assembly or assemblies were then treated by a multi-step process in order to remove air from the interlayer region comprising the polyurethane film as well as to cause the interlayer polyurethane film layers to melt and bond adjacent borosilicate glass layers or polycarbonate sheets. First, the multi-layer assembly or assemblies were treated with a cold vacuum to remove air from between the layers. In particular, a vacuum was applied to the multi-layer assembly or assemblies at a pressure of −0.1 MPa for 2 hours, after the multi-layer assembly or assemblies were placed in a vacuum bag or container. Following the cold vacuum step, the multi-layer assembly or assemblies were placed in an autoclave at a high enough temperature to melt the polyurethane film layer or layers causing the polyurethane interlayers to bond adjacent borosilicate glass sheets or to bond an adjacent borosilicate glass sheet to a polycarbonate sheet. In particular, the autoclave was slowly heated to a maximum temperature of from about 110° C. to about 130° C. The temperature was recorded every 20 minutes before the autoclave reached a temperature of 90° C. and every 10 minutes thereafter. The temperature was slowly raised in the autoclave over 1-2 hours.

Following the heating step, the autoclave was pressurized while still at the 110° C. to about 130° C. temperature in order to expose the multi-layer assembly or assemblies to a hot vacuum. The pressure in the autoclave was slowly raised over about 1-2 hours until a maximum pressure of from about 1.11 MPa to about 1.21 MPa was reached. The hot vacuum conditions were maintained for about another 1-2 hours at the maximum pressure such that the total pressurization process lasted for about 3-4 hours. Operation of the autoclave in this manner discharged additional air remaining in the interlayer region that may remain following the cold vacuum step. Following the hot vacuum step, the autoclave was allowed to slowly cool until the temperature dropped below 30° C. over the course of about 3-5 hours, after which the pressure was allowed to equilibrate.

In some instances, the edges of the lightweight ballistic glass may be sealed before or after the autoclave step using a polyurethane film, including in some instances additional length or overlap of the interlayer polyurethane film layers. Additional layers may be added to the interior or exterior sides of the finished lightweight ballistic glass, such as, for example, additional film or other layers to help provide shading from the sun, or enabling trademark and other markings to be attached to the glass.

The lightweight ballistic glass 200 example depicted in FIG. 2 was tested by two separate facilities. Testing at both facilities demonstrated that lightweight ballistic glass 200 meets the CEN 1063 Level BR7 standard. In particular, the lightweight ballistic glass 200 was demonstrated to stop three impacts of a 7.62×51 mm NATO round occurring within 120 mm of each other at a range of 10.00±0.5 meters, the 7.62×51 mm NATO round having a full metal jacket, pointed bullet, or hard steel core projectile having a weight of 9.8±0.1 grams, and when fired having a projectile velocity of 820±10 m/s resulting in an impact energy of 3290 Joules, wherein the hard steel core projectile has a steel hardness greater than 63 HRC on the Rockwell scale. Further, the lightweight ballistic glass depicted in FIG. 2 was observed to produce no observable spalls after each impact.

Testing was conducted at an indoor range at ambient conditions (65° F./35% relative humidity/30.39 in. Hg), in accordance with the general provisions of EN 1063, Level BR7. Testing was conducted using caliber 7.62 mm, 150 gr., AP M61 ammunition. The test sample(s) were positioned 32.8 feet from the muzzle of the barrel to produce zero (0°) degree obliquity impacts. Photoelectric infrared screens were located at 23.5 feet and 26.5 feet which, in conjunction with electronic chronographs, were used to compute bullet velocities at 25.0 feet forward of the muzzle. Penetrations were determined by visual examination of the 0.0001-inch-thick aluminum foil witness plate, placed 20.0 inches behind and parallel to the impact location. Tables 1 and 2 provide a summary of the test data.

TABLE 1

Ballistic Resistance for Sample of Lightweight Ballistic Glass According to Example 1

| Test Sample | | | | | | Results | | |
|---|---|---|---|---|---|---|---|---|
| Condition-ing | Sample No. | Weight (lbs.) | Caliber | Obliquity | Shots (a) | Velocity (fps) Max | Velocity (fps) Min | Penetrations |
| Ambient | B | 59.31 | 7.62 mm, M61 | 0° | 3 | 2708 | 2686 | 0 |

TABLE 2

Specific Data Records for Individual Shots During Ballistic Resistance Testing

| Shot No. | Ammo. | Time 1 (usec) | Velocity 1 (ft/s) | Time 2 (usec) | Velocity 2 (ft/s) | Avg. Vel. (ft/s) | Vel. Loss (ft/s) | Strike Vel. (ft/s) | Penetration |
|---|---|---|---|---|---|---|---|---|---|
| 1 | 1 | 1106 | 2712 | 1105 | 2715 | 2714 | 6 | 2708 | None |
| 2 | 1 | 1115 | 2691 | 1114 | 2693 | 2692 | 6 | 2686 | None |
| 3 | 1 | 1106 | 2712 | 1106 | 2712 | 2712 | 6 | 2706 | None |

What is claimed is:

1. A lightweight ballistic glass comprising:
   an exterior side comprising an exterior surface of the ballistic glass and an interior side comprising an interior surface of the ballistic glass;
   a plurality of borosilicate glass layers, one of the plurality of borosilicate glass layers forming the exterior surface of the ballistic glass;
   a plurality of exterior aliphatic polyurethane film layers, each of the plurality of borosilicate glass layers separated from an adjacent borosilicate glass layer by at least one of the plurality of exterior aliphatic polyurethane film layers, each of the plurality of exterior aliphatic polyurethane layers in contact with a surface of at least one of the plurality of borosilicate glass layers;
   an interior polycarbonate sheet having a first surface and a second surface, the second surface of the interior polycarbonate sheet forming the interior surface of the ballistic glass;
   an interior aliphatic polyurethane film layer in contact with the first surface of the interior polycarbonate sheet, the interior aliphatic polyurethane film layer positioned to separate the first surface of the polycarbonate sheet from a surface of a borosilicate glass layer; and
   a first exterior polycarbonate sheet, and a second exterior polycarbonate sheet, each exterior polycarbonate sheet having a thickness from about 0.5 mm to about 1.5 mm, the first exterior polycarbonate sheet separated from the second exterior polycarbonate sheet by at least two borosilicate glass layers, each of the at least two borosilicate glass layers having a thickness from about 7.5 mm to about 10.5 mm;
   wherein each of the exterior polycarbonate sheets are separated from the interior polycarbonate sheet by at least three borosilicate glass layers, each of the at least three borosilicate glass layers having a thickness from about 7.5 mm to about 19.5 mm; and wherein each of the exterior polycarbonate sheets is in contact with two of the plurality of exterior aliphatic polyurethane film layers.

2. The lightweight ballistic glass according to claim 1, wherein the exterior surface of the ballistic glass is intended to be positioned so as to face the direction of incoming ballistic attack, and the interior surface of the ballistic glass is intended to face toward the interior of a compartment intended to be protected from ballistic attack by the ballistic glass.

3. The lightweight ballistic glass according to claim 1, wherein the lightweight ballistic glass meets the CEN 1063 Level BR7 standard.

4. The lightweight ballistic glass according to claim 1, wherein the lightweight ballistic glass is operable to stop three impacts of a 7.62×51 mm NATO round occurring within 120 mm of each other at a range of 10.00±0.5 meters, the 7.62×51 mm NATO round having a full metal jacket, pointed bullet, or hard steel core projectile having a weight of 9.8±0.1 grams, and when fired having a projectile velocity of 820±10 m/s resulting in an impact energy of 3290 Joules, wherein the hard steel core projectile has a steel hardness greater than 63 HRC on the Rockwell scale.

5. The lightweight ballistic glass according to claim 1, wherein the lightweight ballistic glass has a weight of no greater than about 155 kilograms per square meter ($kg/m^2$) of exterior surface or interior surface and the total thickness of the lightweight ballistic glass is less than about 75 mm.

6. The lightweight ballistic glass according to claim 1, wherein each of the plurality of exterior aliphatic polyurethane film layers has a thickness of less than 2 millimeters (mm).

7. The lightweight ballistic glass according to claim 1, wherein each of the plurality of exterior aliphatic polyurethane film layers has a thickness of from about 0.5 mm to about 0.75 mm.

8. The lightweight ballistic glass according to claim 1, wherein the interior aliphatic polyurethane film layer is in contact with a surface of a borosilicate glass layer and the interior aliphatic polyurethane film layer has a thickness of from about 1.1 mm to about 1.4 mm.

9. The lightweight ballistic glass according to claim 1, comprising one borosilicate glass layer having a thickness from about 3 mm to about 5 mm, one borosilicate glass layer having a thickness from about 7 mm to about 9 mm, three borosilicate glass layers each having a thickness from about 9 mm to about 11 mm, and one borosilicate glass layer having a thickness from about 18 mm to about 20 mm.

10. The lightweight ballistic glass according to claim 1, wherein the interior polycarbonate sheet is a hard-coated polycarbonate sheet having a thickness of from about 5.5 mm to about 6.5 mm.

11. The lightweight ballistic glass according to claim 1, comprising:
a first borosilicate glass layer forming the exterior surface of the lightweight ballistic glass, the first borosilicate glass layer having a thickness from about 3.5 mm to about 4.5 mm;
a first polycarbonate sheet separated from the first borosilicate glass layer by a first aliphatic polyurethane film layer, the first polycarbonate sheet having a thickness from about 0.5 mm to about 1.5 mm;
a second borosilicate glass layer separated from the first polycarbonate sheet by a second aliphatic polyurethane film layer, the second borosilicate glass layer having a thickness from about 7.5 mm to about 8.5 mm;
a third borosilicate glass layer separated from the second borosilicate glass layer by a third aliphatic polyurethane film layer, the third borosilicate glass layer having a thickness from about 9.5 mm to about 10.5 mm;
a second polycarbonate sheet separated from the third borosilicate glass layer by a fourth aliphatic polyurethane film layer, the second polycarbonate sheet having a thickness from about 0.5 mm to about 1.5 mm;
a fourth borosilicate glass layer separated from the second polycarbonate sheet by a fifth aliphatic polyurethane film layer, the fourth borosilicate glass layer having a thickness from about 9.5 mm to about 10.5 mm;
a fifth borosilicate glass layer separated from the fourth borosilicate glass layer by a sixth aliphatic polyurethane film layer, the fifth borosilicate glass layer having a thickness from about 9.5 mm to about 10.5 mm;
a sixth borosilicate glass layer separated from the fifth borosilicate glass layer by a seventh aliphatic polyurethane film layer, the sixth borosilicate glass layer having a thickness from about 18.5 mm to about 19.5 mm; and
a third polycarbonate sheet forming the interior surface of the lightweight ballistic glass and separated from the sixth borosilicate glass layer by an eighth aliphatic polyurethane film layer, the third polycarbonate sheet having a thickness from about 5.5 mm to about 6.5 mm;
wherein the first, second, third, fourth, fifth, sixth, and seventh aliphatic polyurethane film layers have a thickness from about 0.60 mm to about 0.65 mm and the eighth aliphatic polyurethane film layer has a thickness of from about 1.1 mm to about 1.4 mm.

12. The lightweight ballistic glass according to claim 1, wherein at least one of the plurality of borosilicate glass layers is a borosilicate glass type 3.3 as specified in international standards ISO 3585 and EN 1748 T1.

13. The lightweight ballistic glass according to claim 1, wherein at least one of the plurality of borosilicate glass layers comprises from about 12% to about 14% by weight $B_2O_3$ and from about 80% to about 82% by weight $SiO_2$, from about 3% to about 5% by weight $Na_2O$ or $K_2O$ and from about 1% to about 3% by weight $Al_2O_3$.

14. A method of manufacturing a multi-layered lightweight ballistic glass, the method comprising assembling a multi-layered structure comprising:
a first borosilicate glass layer forming the exterior surface of the lightweight ballistic glass, the first borosilicate glass layer having a thickness from about 3.5 mm to about 4.5 mm;
a first polycarbonate sheet separated from the first borosilicate glass layer by a first aliphatic polyurethane film layer, the first polycarbonate sheet having a thickness from about 0.5 mm to about 1.5 mm;
a second borosilicate glass layer separated from the first polycarbonate sheet by a second aliphatic polyurethane film layer, the second borosilicate glass layer having a thickness from about 7.5 mm to about 8.5 mm;
a third borosilicate glass layer separated from the second borosilicate glass layer by a third aliphatic polyurethane film layer, the third borosilicate glass layer having a thickness from about 9.5 mm to about 10.5 mm;
a second polycarbonate sheet separated from the third borosilicate glass layer by a fourth aliphatic polyurethane film layer, the second polycarbonate sheet having a thickness from about 0.5 mm to about 1.5 mm;
a fourth borosilicate glass layer separated from the second polycarbonate sheet by a fifth aliphatic polyurethane film layer, the fourth borosilicate glass layer having a thickness from about 9.5 mm to about 10.5 mm;

a fifth borosilicate glass layer separated from the fourth borosilicate glass layer by a sixth aliphatic polyurethane film layer, the fifth borosilicate glass layer having a thickness from about 9.5 mm to about 10.5 mm;

a sixth borosilicate glass layer separated from the fifth borosilicate glass layer by a seventh aliphatic polyurethane film layer, the sixth borosilicate glass layer having a thickness from about 18.5 mm to about 19.5 mm; and a third polycarbonate sheet forming the interior surface of the lightweight ballistic glass and separated from the sixth borosilicate glass layer by an eighth aliphatic polyurethane film layer, the third polycarbonate sheet having a thickness from about 5.5 mm to about 6.5 mm;

the first, second, third, fourth, fifth, sixth, and seventh aliphatic polyurethane film layers having a thickness from about 0.60 mm to about 0.65 mm and the eighth aliphatic polyurethane film layer having a thickness of from about 1.1 mm to about 1.4 mm.

15. The method of manufacturing a multi-layered lightweight ballistic glass according to claim 14, further comprising:

applying a cold vacuum to the multi-layered structure in order to remove air from interlayer regions between adjacent borosilicate glass layers or an adjacent borosilicate glass layer and a polycarbonate sheet, the interlayer regions comprising an aliphatic polyurethane film layer;

heating the multi-layered structure in order to cause the aliphatic polyurethane film layers to melt thereby bonding together adjacent borosilicate glass layers or an adjacent borosilicate glass layer and a polycarbonate sheet;

applying a hot vacuum to the multi-layered structure in order to remove additional remaining air from the interlayer regions;

cooling the multi-layered structure to an ambient temperature; and removing the vacuum to produce the multi-layered lightweight ballistic glass.

\* \* \* \* \*